US012614729B2

(12) United States Patent
Imano et al.

(10) Patent No.: US 12,614,729 B2
(45) Date of Patent: *Apr. 28, 2026

(54) ALL SOLID STATE BATTERY

(71) Applicant: TOYOTA JIDOSHA KABUSHIKI KAISHA, Toyota (JP)

(72) Inventors: Manabu Imano, Nagoya (JP); Fuminori Mizuno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

This patent is subject to a terminal disclaimer.

(21) Appl. No.: 18/584,248

(22) Filed: Feb. 22, 2024

(65) Prior Publication Data

US 2024/0194877 A1 Jun. 13, 2024

Related U.S. Application Data

(63) Continuation of application No. 17/975,669, filed on Oct. 28, 2022.

(30) Foreign Application Priority Data

Nov. 18, 2021 (JP) ................................ 2021-187654

(51) Int. Cl.
*H01M 4/62* (2006.01)
*H01M 4/02* (2006.01)
(Continued)

(52) U.S. Cl.
CPC ............ *H01M 4/62* (2013.01); *H01M 4/661* (2013.01); *H01M 4/70* (2013.01);
(Continued)

(58) Field of Classification Search
CPC .......... H01M 4/62; H01M 4/661; H01M 4/70; H01M 10/0525; H01M 10/0562;
(Continued)

(56) References Cited

U.S. PATENT DOCUMENTS

2012/0088139 A1* 4/2012 Sakai .................... H01M 4/808 29/623.1
2013/0084491 A1* 4/2013 Nakamoto ........... C07D 233/10 250/311
(Continued)

FOREIGN PATENT DOCUMENTS

CN 111095653 A * 5/2020 ........ H01M 10/0562
JP 2004071245 A * 3/2004
(Continued)

OTHER PUBLICATIONS

Machine Translation of CN-111095653-A (May 20, 2025) (Year: 2025).*
(Continued)

*Primary Examiner* — Matthew J Merkling
(74) *Attorney, Agent, or Firm* — OLIFF PLC.

(57) ABSTRACT

A main object of the present disclosure is to provide an all solid state battery in which increase of internal resistance is suppressed. The present disclosure achieves the object by providing an all solid state battery including a cathode, an anode, and a solid electrolyte layer arranged between the cathode and the anode, wherein: the anode includes an anode active material layer and an anode current collector; the anode active material layer contains an anode active material, a sulfide solid electrolyte, and a molten salt of which melting point is 30° C. or more and 80° C. or less; and the anode current collector is a current collector in which a sulfidation due to the sulfide solid electrolyte occurs.

5 Claims, 1 Drawing Sheet

(51) Int. Cl.

| | |
|---|---|
| ***H01M 4/66*** | (2006.01) |
| ***H01M 4/70*** | (2006.01) |
| ***H01M 10/0525*** | (2010.01) |
| ***H01M 10/0562*** | (2010.01) |
| ***H01M 10/0585*** | (2010.01) |

(52) U.S. Cl.
CPC ... *H01M 10/0525* (2013.01); *H01M 10/0562* (2013.01); *H01M 10/0585* (2013.01); *H01M 2004/027* (2013.01); *H01M 2300/0068* (2013.01)

(58) Field of Classification Search
CPC ....... H01M 10/0585; H01M 2004/027; H01M 2300/0068
See application file for complete search history.

(56) References Cited

U.S. PATENT DOCUMENTS

2014/0197800 A1* 7/2014 Nagase .................... H02J 7/00 320/136
2016/0028134 A1* 1/2016 Takechi ................ H01M 4/382 429/405
2017/0062823 A1 3/2017 Yamaguchi et al.

FOREIGN PATENT DOCUMENTS

| | | | | |
|---|---|---|---|---|
| JP | 2011-151143 | A | | 8/2011 |
| JP | 2017-050109 | A | | 3/2017 |
| JP | 2019096541 | A | * | 6/2019 |
| JP | 2020-177904 | A | | 10/2020 |
| WO | 2011/074325 | A1 | | 6/2011 |

OTHER PUBLICATIONS

Machine Translation of JP-2004071245-A (May 20, 2025) (Year: 2025).*
Machine Translation of JP-2019096541-A (May 20, 2025) (Year: 2025).*
May 22, 2025 Office Action issued in U.S. Appl. No. 17/975,669.
Oct. 7, 2025 Office Action issued in U.S. Appl. No. 17/975,669.
Jan. 27, 2026 Notice of Allowance issued in U.S. Appl. No. 17/975,669.

* cited by examiner

Comparative Example 1

Example 1

ALL SOLID STATE BATTERY

TECHNICAL FIELD

The present disclosure relates to an all solid state battery.

BACKGROUND ART

An all solid state battery is a battery including a solid electrolyte layer between a cathode and an anode, and one of the advantages thereof is that the simplification of a safety device may be more easily achieved compared to a liquid-based battery including a liquid electrolyte containing a flammable organic solvent. The anode usually includes an anode current collector and an anode active material. Patent Literature 1 discloses an anode for all solid state battery using a nickel foil as an anode current collector. Also, Patent Literature 1 discloses that the anode active material contains a solid electrolyte such as a sulfide solid electrolyte, an oxide solid electrolyte and a polymer electrolyte. Meanwhile, a molten salt with excellent ion conductivity and electron conductivity has been known. For example, Patent Literature 2 discloses a molten salt containing the specified first imidazolium salt and the specified second salt.

CITATION LIST

Patent Literatures

Patent Literature 1: Japanese Patent Application Laid-Open (JP-A) No. 2020-177904

Patent Literature 2: International Application Publication: WO 2011/074325

SUMMARY OF DISCLOSURE

Technical Problem

Among the solid electrolytes, the sulfide solid electrolyte has an advantage of high ion conductivity. Meanwhile, when the anode active material layer contains the sulfide solid electrolyte, the sulfide solid electrolyte reacts with an anode current collector, and the anode current collector may be sulfurized. When the anode current collector is sulfurized, internal resistance increases to deteriorate the battery properties.

The present disclosure has been made in view of the above circumstances and a main object thereof is to provide an all solid state battery in which increase of internal resistance is suppressed.

Solution to Problem

The present disclosure provides an all solid state battery including a cathode, an anode, and a solid electrolyte layer arranged between the cathode and the anode, wherein: the anode includes an anode active material layer and an anode current collector; the anode active material layer contains an anode active material, a sulfide solid electrolyte, and a molten salt of which melting point is 30° C. or more and 80° C. or less; and the anode current collector is a current collector in which a sulfidation due to the sulfide solid electrolyte occurs.

According to the present disclosure, the anode active material layer contains the specified molten salt, and thus increase of the internal resistance in the all solid state battery is suppressed even when the specified anode current collector is used.

In the disclosure, the molten salt may include an ammonium-based cation.

In the disclosure, the molten salt may further include a Li ion.

In the disclosure, the molten salt may include an anion with a sulfonyl amide structure.

In the disclosure, the anode active material layer may contain tetrabutylammoniumbis(trifluoromethanesulfonyl)amide and lithiumbis(trifluoromethanesulfonyl)amide, as the molten salt.

In the disclosure, the anode current collector may contain at least one kind element of Ni, Fe, and Cu.

In the disclosure, the anode current collector may be a metal foil with a roughen surface.

In the disclosure, the anode active material layer may not contain a granulated body including the anode active material and the molten salt.

Advantageous Effects of Disclosure

The present disclosure exhibits an effect of providing an all solid state battery in which increase of internal resistance is suppressed.

DESCRIPTION OF EMBODIMENTS

The all solid state battery in the present disclosure will be hereinafter explained in details.

Figure 1:
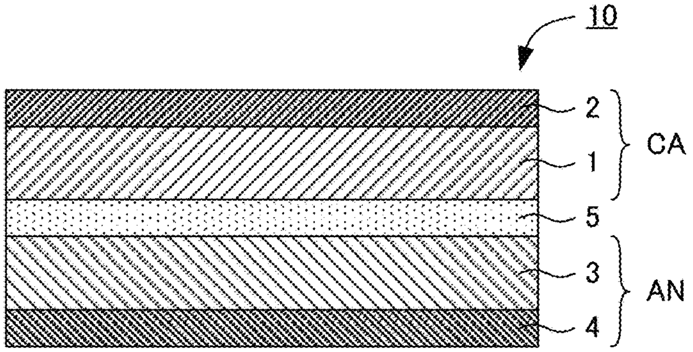
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 includes cathode CA including cathode active material layer 1 and cathode current collector 2, anode AN including anode active material layer 3 and anode current collector 4, and solid electrolyte layer 5 arranged between the cathode active material layer 1 and the anode active material layer 3. The anode active material layer 3 contains an anode active material, a sulfide solid electrolyte, and a molten salt of which melting point is 30° C. or more and 80° C. or less. Also, the anode current collector 4 is a current collector in which a sulfidation due to the sulfide solid electrolyte included in the anode active material layer 3 occurs.

According to the present disclosure, the anode active material layer contains the specified molten salt, and thus increase of the internal resistance in the all solid state battery is suppressed even when the specified anode current collector is used. As described above, when the anode active material layer contains the sulfide solid electrolyte, the sulfide solid electrolyte may react with the anode current collector, and the anode current collector may be sulfurized. When the anode current collector is sulfurized, internal resistance increases to deteriorate the battery properties. In particular, when charge and discharge are repeated, internal resistance will increase over time, and the battery properties will greatly degrade. In contrast, the molten salt in the present disclosure works as a so-called sacrificial material to presumably protect the anode current collector. For this reason, the sulfidation (chemical corrosion) of the anode current collector is inhibited, and thereby the increase of the internal resistance is presumably suppressed.

1. Anode

The anode in the present disclosure includes an anode active material layer and an anode current collector.

(1) Anode Active Material Layer

The anode active material layer in the present disclosure contains an anode active material, a sulfide solid electrolyte, and a molten salt.

(i) Molten Salt

The melting point of the molten salt in the present disclosure is usually 30° C. or more and 80° C. or less. The molten salt in the present disclosure corresponds to an ionic compound that is in a solid state at 25° C. (normal temperature), which is different from a Room Temperature Ionic Liquid (RTIL) that is in a liquid state at 25° C. The melting point of the molten salt may be 40° C. or more, and may be 50° C. or more. Meanwhile, the melting point of the molten salt is, for example, 70° C. or less.

The molten salt includes a cation and an anion. Examples of the cation may include an inorganic cation such as a lithium ion, a sodium ion, a potassium ion, and a cesium ion; and an organic cation such as an ammonium-based cation, a piperidinium-based cation, a pyrrolidinium-based cation, an imidazolium-based cation, a pyridium-based cation, an alicyclic amine-based cation, an aliphatic amine-based cation, and an aliphatic phosphonium-based cation. The molten salt may include just one kind of the cation, and may contain two kinds or more thereof. Also, the molten salt may include both of the inorganic cation and the organic cation.

The molten salt preferably includes an ammonium-based cation. The ammonium-based cation is preferably represented by, for example, a general formula: $N^+R_1R_2R_3R_4$ (Each of $R_1$ to $R_4$ is independently a hydrocarbon group). Examples of the hydrocarbon group may include a saturated hydrocarbon group, an unsaturated hydrocarbon group, and an aromatic hydrocarbon group. The hydrocarbon group may be an alkyl group. The number of carbon atoms of the hydrocarbon group may be, for example, 1, may be 2, may be 3, may be 4 and may be 5 or more. Meanwhile, the number of carbon atoms of the hydrocarbon group is, for example, 10 or less. The ammonium-based cation may or may not be a tetrabutyl ammonium ion. Also, the molten salt preferably includes a Li ion. In particular, the molten salt preferably includes the both of the Li ion and the ammonium-based cation.

Examples of the anion of the molten salt may include an anion with a sulfonyl amide structure. Examples of the anion with the sulfonyl amide structure may include bis(trifluoromethanesulfonyl)amide, bis(fluorosulfonyl)amide, bis(pentafluoroethanesulfonyl)amide, and (fluorosulfonyl) (trifluoromethanesulfonyl)amide. The molten salt may contain just one kind of the anion, and may include two kinds or more thereof.

The molten salt preferably contains at least lithiumbis(trifluoromethanesulfonyl)amide (Li-TFSA), and may contain lithiumbis(trifluoromethanesulfonyl)amide (Li-TFSA) and tetrabutylammoniumbis(trifluoromethanesulfonyl)amide (TBA-TFSA). The molar ratio of TBA-TFSA with respect to Li-TFSA is, for example, 0.5 or more, may be 1 or more, and may be 2 or more. Meanwhile, the molar ratio is, for example, 100 or less and may be 50 or less.

Also, the molten salt preferably contains at least lithiumbis(fluorosulfonyl)amide (Li-FSA), and may contain lithiumbis(fluorosulfonyl)amide (Li-FSA) and cesiumbis(fluorosulfonyl)amide (Cs-FSA). The molar ratio of Cs-FSA with respect to Li-FSA is, for example, 0.5 or more, may be 1 or more, and may be 2 or more. Meanwhile, the molar ratio is, for example, 100 or less and may be 50 or less.

Also, the molten salt may include a first imidazolium salt containing a cation represented by the general formula (1) and $MX_4$ (M is a transition metal and X is a halogen), and a second salt containing a univalent cation and a halogen.

The first imidazolium salt contains a cation represented by the general formula (1).

[Chemical Formula 1]

General Formula (1)

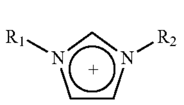

In the general formula (1), each of $R_1$ and $R_2$ is an alkyl group with 1 to 10 carbon atoms, and may be an alkyl group with 1 to 4 carbon atoms. Examples of the alkyl group may include an ethyl group, a methyl group, a propyl group, and a butyl group. $R_1$ and $R_2$ may be the same and may be different.

Also, the first imidazolium salt contains $MX_4$ (M is a transition metal and X is a halogen). Examples of the M may include Fe, Cr, V, Co, Mn, Ti, Ru, and Pb. Meanwhile, examples of the X may include F, Cl, Br, and I. Also, the valence of the M in $MX_4$ is preferably divalent or trivalent.

Meanwhile, the second salt contains a univalent cation. An example of the univalent cation may be a cation represented by a general formula (2).

[Chemical Formula 2]

General Formula (2)

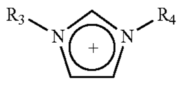

$R_3$ and $R_4$ in the general formula (2) are the same as $R_1$ and $R_2$ described above; and thus the descriptions herein are omitted. Also, $R_3$ and $R_1$ may be the same, and $R_4$ and $R_2$ may be the same.

Also, additional examples of the univalent cation in the second salt may include an alkali metal ion such as a lithium ion, a sodium ion, a potassium ion.

Also, the second salt contains a halogen. Examples of the halogen in the second salt may include F, Cl, Br, and I.

The proportions of the first imidazolium salt and the second salt in the molten salt are not particularly limited, but the proportion of the second salt with respect to 100 parts by mol of the first imidazolium salt is, for example, 100 parts by mol or less, may be 80 parts by mol or less, and may be 50 parts by mol or less. Meanwhile, the proportion of the second salt is, for example, 1 part by mol or more.

The molten salt preferably has high Li ion conductivity. The Li ion conductivity of the molten salt at 25° C. is, for example, $1*10^{-6}$ S/cm or more, and may be $1*10^{-5}$ S/cm or more. Also, the molten salt preferably has high electron conductivity.

There are no particular limitations on the proportion of the molten salt in the anode active material layer. In the anode active material layer, the molten salt with respect to 100 parts by weight of the anode active material is, for example, 1 part by weight or more, may be 5 parts by weight or more, and may be 10 parts by weight or more. Meanwhile, the molten salt with respect to 100 parts by weight of the anode active material is, for example, 30 parts by weight or less, may be 20 parts by weight or less, and may be 15 parts by weight or less. Incidentally, the molten salt with respect to 100 parts by weight of the anode active material may be more than 30 parts by weight.

(ii) Anode Active Material

The anode active material in the present disclosure is not particularly limited, and known anode active materials may be used. Examples of the anode active material may include a Si-based active material. The Si-based active material is an active material containing a Si element. Examples of the Si-based active material may include a simple substance Si, a Si alloy and a Si oxide. The Si alloy preferably contains a Si element as a main component. Meanwhile the anode active material layer may not contain the Si-based active material. Examples of the anode active material other than the Si-based active material may include a Li-based active material such as a metal lithium and a lithium alloy; a carbon-based active material such as graphite, hard carbon and soft carbon; and an oxide-based active material such as lithium titanate.

Examples of the shape of the anode active material may include a granular shape. There are no particular limitations on the average particle size ($D_{50}$) of the anode active material, but for example, it is 10 μm or less, may be 5 μm or less, and may be 2 μm or less. Meanwhile, the average particle size ($D_{50}$) of the anode active material is, for example, 0.1 μm or more. The average particle size ($D_{50}$) is a particle size of 50% accumulation (median diameter), which may be calculated from, for example, a measurement with a laser diffraction particle distribution meter or a scanning electron microscope (SEM).

The proportion of the anode active material in the anode active material layer is, for example, 40 weight % or more, may be 50 weight % or more and may be 60 weight % or more. Meanwhile, the proportion of the anode active material in the anode active material layer is, for example, 95 weight % or less.

(iii) Sulfide Solid Electrolyte

The anode active material layer contains a sulfide solid electrolyte. The sulfide solid electrolyte usually contains sulfur (S) as a main component of the anion element. It is preferable that the sulfide solid electrolyte contains, for example, a Li element, an X element (X is at least one kind of P, As, Sb, Si, Ge, Sn, B, Al, Ga, and In), and a S element. Also, the sulfide solid electrolyte may contain at least one of a Cl element, a Br element, and an I element, as the halogen element. Also, the sulfide solid electrolyte may contain an O element.

The sulfide solid electrolyte may be a glass-based sulfide solid electrolyte, may be a glass ceramic-based sulfide solid electrolyte, and may be a crystal-based sulfide solid electrolyte. Also, when the sulfide solid electrolyte includes a crystal phase, examples of the crystal phase may include a Thio-LISICON type crystal phase, a LGPS type crystal phase, and an argyrodite type crystal phase.

There are no particular limitations on the composition of the sulfide solid electrolyte, and examples thereof may include $xLi_2S\cdot(100-x)\ P_2S_5$ ($70\leq x\leq 80$), and $yLiI\cdot zLiBr\cdot(100-y-z)\ (xLi_2S\cdot(1-x)P_2S_5)$ ($0.7\leq x\leq 0.8$, $0\leq y\leq 30$, $0\leq z\leq 30$).

The sulfide solid electrolyte may have a composition represented by a general formula: $Li_{4-x}Ge_{1-x}P_xS_4$ ($0<x<1$). In the general formula, at least a part of Ge may be substituted with at least one of Sb, Si, Sn, B, Al, Ga, In, Ti, Zr, V and Nb. In the general formula, at least a part of P may be substituted with at least one of Sb, Si, Sn, B, Al, Ga, In, Ti, Zr, V and Nb. In the general formula, a part of Li may be substituted with at least one of Na, K, Mg, Ca and Zn. In the general formula, a part of S may be substituted with halogen (at least one of F, Cl, Br and I).

Additional examples of the composition of the sulfide solid electrolyte may include $Li_{7-x-2y}PS_{6-x-y}X_y$, $Li_{8-x-2y}SiS_{6-x-y}X_y$, and $Li_{8-x-2y}GeS_{6-x-y}X_y$. In these compositions, X is at least one kind of F, Cl, Br and I, and x and y satisfy $0\leq x$, $0\leq y$.

The sulfide solid electrolyte preferably has high Li ion conductivity. The Li ion conductivity of the sulfide solid electrolyte at 25° C. is, for example, $1*10^{-4}$ S/cm or more, and is preferably $1*10^{-3}$ S/cm or more. Also, examples of the shape of the sulfide solid electrolyte may include a granular shape. The average particle size ($D_{50}$) of the sulfide solid electrolyte is, for example, 0.1 μm or more and 50 μm or less.

(iv) Anode Active Material Layer

The anode active material layer may or may not contain a granulated body including an anode active material and a molten salt. The granulated body is formed when a plurality of anode active material particles aggregates via the molten salt. Whether the anode active material layer contains the granulated body or not may be determined by, for example, observing the cross-section of the anode active material layer by a scanning electron microscope—energy dispersive X-ray measurement (SEM-EDX measurement). In specific, when it is confirmed that the elements included in the anode active material and the constituent elements of the molten salt are concentrated at the same point based on the cross-section EDX analysis, and further when it is confirmed that the particles of the anode active material are aggregated based on the cross-section SEM image analysis, it can be determined that the anode active material layer contains the granulated body. Meanwhile, if it does not fall under the above case, it can be determined that the anode active material layer does not contain the granulated body. The granulated body may or may not contain a binder. The granulated body may not contain a solid electrolyte. Similarly, the granulated body may not contain a conductive material.

The anode active material layer may further contain at least one of a conductive material and a binder. Examples of the conductive material may include a carbon material, a metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF). Also, examples of the binder may include a fluorine-based binder such as polyvinylidene fluoride (PVDF) and polytetra fluoroethylene (PTFE), and a rubber-based binder such as a butadiene rubber, and an acrylic binder. Also, the thickness of the anode active material layer is, for example, 0.1 μm or more and 1000 μm or less.

(2) Anode Current Collector

The anode current collector is a part that collects currents of the anode active material layer. The anode current collector is, for example, arranged in the surface of the anode active material layer which is opposite to the solid electrolyte layer. The anode current collector is a current collector in which a sulfidation due to the sulfide solid electrolyte occurs. Whether it is "the anode current collector in which a sulfidation due to the sulfide solid electrolyte occurs" or not is determined by, for example, the method described in Comparative Example later. In specific, it is determined in the manner such that an evaluation battery not containing the molten salt is produced, a charge and discharge test for durability is conducted thereto, and then the surface of the anode current collector is observed.

The anode current collector usually contains a metal element. Examples of the metal element may include Ni, Fe and Cu. The anode current collector may be a simple substance of metal, and may be a metal alloy. The metal alloy may be an alloy mainly composed of Ni, may be an alloy mainly composed of Fe, and may be an alloy mainly composed of Cu. For example, "the alloy mainly composed of Ni" refers to the alloy in which the proportion of Ni atoms are the most. The same applies to the other alloys, too. Examples of the alloy mainly composed of Fe may include stainless steel (SUS).

The anode current collector may be a metal foil with a roughen surface (typically a roughen metal foil). The metal foil with a roughen surface refers to a metal foil of which surface roughness Rz is 1.5 μm or more. When the anode current collector has the roughen surface, the molten salt may be easily spread on the surface of the anode current collector, since valleys are formed on the surface of the anode current collector. As a result, the anode current collector may be effectively protected by the molten salt, and thus occurrence of corrosion in the anode current collector can be suppressed. The surface roughness Rz of the anode current collector may be 2.0 μm or more and may be may be 3.0 μm or more. Meanwhile, the surface roughness Rz is, for example, 10 μm or less. The surface roughness Rz refers to the maximum height roughness, which can be calculated by taking out a part of a roughness curve measured in the roughness meter in a reference length, and summing the highest part (maximum peak height: Rp) and the deepest part (maximum valley depth: Rv). Also, examples of the shape of the anode current collector may include a foil shape and a mesh shape.

2. Cathode

The cathode in the present disclosure usually includes a cathode active material layer and a cathode current collector. The cathode active material layer is a layer containing at least a cathode active material. Also, the cathode active material layer may contain at least one of a solid electrolyte, a conductive material, and a binder, as required.

Typical examples of the cathode active material may be an oxide active material. Examples of the oxide active material may include a rock salt bed type active material such as $LiCoO_2$, $LiMnO_2$, $LiNiO_2$, $LiVO_2$, and $LiNi_{1/3}CO_{1/3}Mn_{1/3}O_2$; a spinel type active material such as $LiMn_2O_4$, $Li(Ni_{0.5}Mn_{1.5})O_4$; and an olivine type active material such as $LiFePO_4$, $LiMnPO_4$, $LiNiPO_4$, and $LiCuPO_4$.

Also, the surface of the cathode active material may be coated by a coating layer. The coating layer may inhibit the reaction of the cathode active material and the solid electrolyte (particularly a sulfide solid electrolyte). Examples of the coating layer may include a Li-containing oxide such as $LiNbO_3$, $Li_3PO_4$, and LiPON. The average thickness of the coating layer is, for example, 1 nm or more. Meanwhile, the average thickness of the coating layer is, for example, 20 nm or less and may be 10 nm or less.

The solid electrolyte, the conductive material and the binder to be used in the cathode active material layer are in the same contents as those described in "1. Anode" above; thus, the descriptions herein are omitted. Also, the thickness of the cathode active material layer is, for example, 0.1 μm or more and 1000 μm or less.

The cathode current collector is a part that collects currents of the cathode active material layer. The cathode current collector is, for example, arranged in the surface of the cathode active material layer which is opposite to the solid electrolyte layer. Examples of the material for the cathode current collector may include Al, SUS and Ni. Examples of the shape of the cathode current collector may include a foil shape and a mesh shape.

3. Solid Electrolyte Layer

The solid electrolyte layer in the present disclosure is a layer arranged between the cathode and the anode. In specific, the solid electrolyte layer is arranged between the cathode active material layer in the cathode and the anode active material layer in the anode. The solid electrolyte contains at least a solid electrolyte. Also, the solid electrolyte layer may further contain a binder as required. The solid electrolyte and the binder are in the same contents as those described in "1. Anode" above; thus, the descriptions herein are omitted. Also, the thickness of the solid electrolyte layer is, for example, 0.1 μm or more and 1000 μm or less.

4. All Solid State Battery

The all solid state battery in the present disclosure may include an outer package for storing the cathode, the solid electrolyte layer, and the anode. The outer package may be a laminate-type outer package, and may be a case-type outer package.

The all solid state battery in the present disclosure may include a restraining jig that applies a restraining pressure along with the thickness direction of the cathode, the solid electrolyte layer and the anode. Excellent ion conducting path and electron conducting path may be formed by applying the restraining pressure. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less. There are no particular limitations on the kind of the restraining jig, and examples thereof may include a restraining jig that applies restraining torque by a bolt.

The kind of the all solid state battery in the present disclosure is not particularly limited, but is typically an all solid lithium ion secondary battery. Examples of the application of the all solid state battery may include a power source for vehicles such as hybrid electric vehicles (HEV), plug-in hybrid electric vehicles (PHEV), battery electric vehicles (BEV), gasoline-fueled automobiles and diesel powered automobiles. In particular, it is preferably used as a power source for driving hybrid electric vehicles and battery electric vehicles. Also, the all solid state battery in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Production of Cathode>

As a raw material, a mixture containing a cathode active material (NCA-based cathode active material), a sulfide solid electrolyte ($Li_2S$—$P_2S_5$-based sulfide solid electrolyte), a conductive material (vapor grown carbon fiber), a binder (PVdF-based binder) and a dispersion medium (butyl butyrate), was agitated by an ultrasonic dispersion device to produce a cathode slurry. Here, the weight ratio of, the cathode active material:the sulfide solid electrolyte:the conductive material: the binder was 100:16:2:0.75. This cathode slurry was pasted on a cathode current collector (Al foil) by a blade method, and dried on a hot plate at 100° C. for 30 minutes. Thereby, a cathode including a cathode current collector and a cathode active material layer was obtained.

<Synthesis of Molten Salt>

As raw materials, tetrabutylammoniumbis(trifluoromethanesulfonyl)amide (TBA-TFSA), and lithiumbis(trifluoromethanesulfonyl)amide (Li-TFSA) were prepared. Next, TBA-TFSA and Li-TFSA were heated and mixed so as to be 1:1 in the molar ratio, and thereby a molten salt was obtained. A differential scanning calorimetry measurement (DSC measurement) was conducted to the obtained molten salt in the condition of 1° C./min. As a result, the melting point of the molten salt was 56° C., that was in a solid state at a normal temperature (25° C.). Incidentally, the melting points of TBA-TFSA and Li-TFSA are respectively 90° C. and 235° C.

<Production of Anode>

As a raw material, a mixture containing an anode active material (Si particle), the synthesized molten salt, a sulfide solid electrolyte ($Li_2S$—$P_2S_5$-based sulfide solid electrolyte), a conductive material (vapor grown carbon fiber), a binder (BR-based binder) and a dispersion medium (diisobutyl ketone), was agitated by a thin-film spin system high-speed mixer (FILMIX) to produce an anode slurry. Here, the weight ratio of the Si particle:the molten salt:the sulfide solid electrolyte: the conductive material:the binder was 100:11.5:76:15:4. This anode slurry was pasted on an anode current collector (roughen Ni foil; Rz=2.0 μm) by a blade method, and dried on a hot plate at 100° C. for 30 minutes. Thereby, an anode including an anode current collector and an anode active material layer was obtained.

<Production of Solid Electrolyte Layer>

As a raw material, a solid electrolyte mixture containing a sulfide solid electrolyte ($Li_2S$—$P_2S_5$-based sulfide solid electrolyte), a binder (PVdF-based binder) and a dispersion medium (butyl butyrate), was agitated by an ultrasonic dispersion device to produce a solid electrolyte slurry. Here, the weight ratio of the sulfide solid electrolyte:the binder was 99.6:0.4. This solid electrolyte slurry was pasted on an Al foil by a blade method and dried on a hot plate at 100° C. for 30 minutes, and thereby a peelable solid electrolyte layer was obtained.

<Production of Cathode Layered Body>

The cathode active material layer in the cathode and the peelable solid electrolyte layer were layered so that the mixture surfaces overlapped. The product was pressed by a roll-pressing machine in the conditions of the pressing pressure of 50 kN/cm and the temperature of 160° C., and then the Al foil was peeled off from the solid electrolyte layer and punched out into the size of 1 $cm^2$ to obtain a cathode layered body.

<Production of Anode Layered Body>

The anode active material layer in the anode and the peelable solid electrolyte layer were layered so that the mixture surfaces overlapped. The product was pressed by a roll-pressing machine in the conditions of the pressing pressure of 50 kN/cm and the temperature of 160° C., and then the Al foil was peeled off from the solid electrolyte layer and punched out into the size of 1.08 $cm^2$ to obtain an anode layered body. After that, the solid electrolyte layer of the anode layered body and the peelable solid electrolyte layer were layered so that the mixture surfaces overlapped. This layered body was provisionally pressed by a plane uniaxial pressing machine in the conditions of the pressing pressure of 100 MPa and the temperature of 25° C. After that, the Al foil was peeled off from the solid electrolyte layer and punched out into the size of 1.08 $cm^2$ to obtain an anode layered body including an additional solid electrolyte layer.

<Production of Evaluation Battery>

The cathode layered body and the anode layered body including an additional solid electrolyte layer were layered so that the mixture surfaces overlapped. This layered body was pressed by a plane uniaxial pressing machine in the conditions of the pressing pressure of 200 MPa and the temperature of 120° ° C. to obtain a battery layered body. The obtained battery layered body was sandwiched between two pieces of restraining plates, and the two pieces of the restraining plates were fasten by a fastener at the restraining pressure of 10 MPa, and thereby an evaluation battery was produced.

Comparative Example 1

An evaluation battery was produced in the same manner as in Example 1 except that the molten salt was not used to produce the anode. In specific, as a raw material, an anode mixture containing an anode active material (Si particle), a sulfide solid electrolyte ($Li_2$—$P_2S_5$-based sulfide solid electrolyte), a conductive material (vapor grown carbon fiber), a binder (BR-based binder) and a dispersion medium (diisobutyl ketone), was agitated by a thin-film spin system high-speed mixer (FILMIX) to produce an anode slurry. Here, the weight ratio of the Si particle:the sulfide solid electrolyte:the conductive material:the binder was 100:87.5:15:4. An evaluation battery was produced in the same manner as in Example 1 except that the obtained anode slurry was used.

Evaluation

<Charge and Discharge Test>

Charge and discharge tests were conducted to the evaluation batteries obtained in Example 1 and Comparative Example 1. First, the initial charge and discharge were conducted in the following conditions: the batteries were respectively constant-current (CC) charged at 1/10 C until 4.05 V, and then constant-voltage (CV) charged at 4.05 V until the termination current of 1/100 C; then, the batteries were respectively CC-discharged at 1/10 C until 2.5 V, and then CV-discharged at 2.5 V until the termination current of 1/100 C.

Next, the initial resistance measurement was conducted. In other words, the batteries were respectively constant-current (CC) charged at 1/10 C until 3.0 V, and then constant-voltage (CV) charged at 3.0 V until the termination current of 1/100 C to adjust the charge state. After the adjustment of the charge state, an impedance was measured at a room temperature, and a DC resistance was obtained from the circular arc component of high frequency side.

Next, as charge and discharge for durability, charge and discharge were repeated for 100 times in the following conditions:

Charge for durability: CC-charge at 1 C until 4.05 V; and

Discharge for durability: CC-discharge at 1 C until 2.5 V.

Next, the resistance measurement after the durability test was conducted. In other words, the batteries were respectively constant-current (CC) charged at 1/10 C until 3.0 V, and then constant-voltage (CV) charged at 3.0 V until the termination current of 1/100 C to adjust the charge state. After the adjustment of the charge state, an impedance was measured at a room temperature, and a DC resistance was obtained from the circular arc component of high frequency side. The rate of the DC resistance in the 100th cycle with respect to the DC resistance in the first cycle was obtained as the resistance increase rate (%). The results are shown in FIG. 2.

Figure 2:
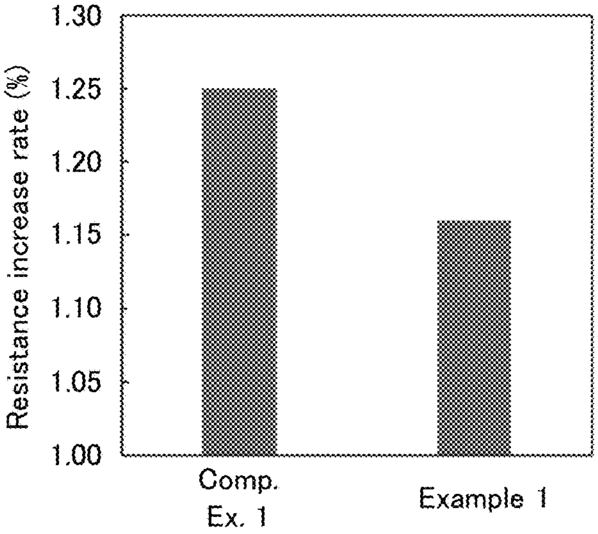
FIG. 2 is the results of resistance increase rate of the evaluation batteries obtained in Example 1 and Comparative Example 1.

As shown in FIG. 2, the resistance increase rate (1.16%) of Example 1 was smaller than the resistance increase rate (1.25%) of Comparative Example 1, and it was confirmed that the increase of internal resistance was suppressed. The reason therefor is presumably because the molten salt worked as a sacrificial material.

<Sem Observation>

Figure 3:
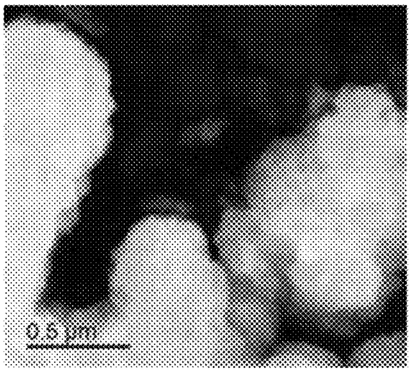
FIG. 3 is the results of SEM observations of the evaluation batteries obtained in Example 1 and Comparative Example 1.
Figure 3:
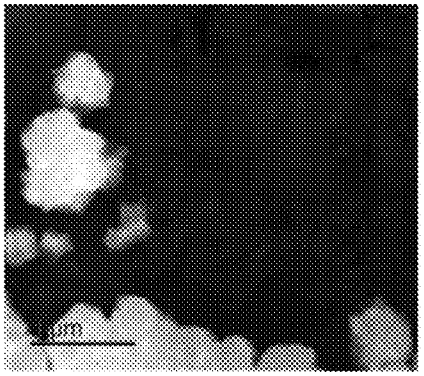

The anode current collector of the evaluation battery after the durability test was observed by a scanning electron microscope (SEM). The results are shown in FIG. 3. As shown in FIG. 3, in Comparative Example 1, it was confirmed that NiS (reaction product of Ni and sulfide solid electrolyte) coated the surface of Ni. In Comparative Example 1, it was presumed that Ni configuring the anode current collector corroded due to sulfur component over time. When NiS is produced, it becomes a resistance body, and electron transfer between the anode current collector and the anode active material layer is inhibited. For this reason, it is presumed that the internal resistance of the battery increased. On the other hand, in Example 1, it was not confirmed that NiS coated the surface of Ni. In Example 1, it was presumed that the molten salt worked as a sacrificial material to protect the surface of the anode current collector, and thus the corrosion due to sulfur component over time was inhibited. In this manner, it was confirmed that the increase of internal resistance was suppressed when the specified molten salt was used in the anode active material layer. Also, the sulfidation of the anode current collector is a reaction of the anode current collector and the sulfide solid electrolyte, and thus the kind of the anode active material presumably does not give influence thereto. For this reason, it is presumed that the increase of internal resistance can be suppressed by using the specified molten salt even when the active material other than Si is used as the anode active material.

REFERENCE SIGNS LIST

1 cathode active material layer
2 cathode current collector
3 anode active material layer
4 anode current collector
5 solid electrolyte layer
10 all solid state battery

What is claimed is:

1. A vehicle comprising an all solid state battery, wherein the all solid state battery comprises a cathode, an anode, and a solid electrolyte layer arranged between the cathode and the anode, wherein the anode includes an anode active material layer and an anode current collector;

the anode active material layer contains an anode active material containing a Si element, a sulfide solid electrolyte, and a molten salt of which melting point is 30° C. or more and 80° C. or less;

the anode current collector is a current collector in which a sulfidation due to the sulfide solid electrolyte occurs; and the molten salt is lithium bis(fluorosulfonyl)amide (Li-FSA) and cesium bis(fluorosulfonyl)amide (Cs-FSA).

2. The vehicle according to claim 1, wherein the anode current collector contains at least one kind element of Ni, Fe and Cu.

3. The vehicle according to claim 1, wherein the anode current collector is a metal foil with a roughen surface.

4. The vehicle according to claim 1, wherein the anode active material does not contain a granulated body including the anode active material and the molten salt.

5. The vehicle according to claim 1, wherein the anode active material layer contains a granulated body including the anode active material, the molten salt and a binder.

* * * * *